(12) United States Patent
Lee et al.

(10) Patent No.: US 8,218,957 B2
(45) Date of Patent: Jul. 10, 2012

(54) IMAGE STABILIZER

(75) Inventors: Jin-won Lee, Seongnam-si (KR);
Chong-sam Chung, Gyeonggi-do (KR);
Hae-in Chung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 145 days.

(21) Appl. No.: 12/856,329

(22) Filed: Aug. 13, 2010

(65) Prior Publication Data
US 2011/0097061 A1    Apr. 28, 2011

(30) Foreign Application Priority Data
Oct. 26, 2009    (KR) .................. 10-2009-0101875

(51) Int. Cl.
*G03B 17/00* (2006.01)
(52) U.S. Cl. .......................................... 396/55
(58) Field of Classification Search ............. 396/55
See application file for complete search history.

(56) References Cited

U.S. PATENT DOCUMENTS

| | | | |
|---|---|---|---|
| 2006/0067660 A1* | 3/2006 | Seo | 396/55 |
| 2008/0225126 A1 | 9/2008 | Mogamiya | |
| 2008/0291540 A1* | 11/2008 | Nakamura et al. | 359/554 |
| 2010/0178044 A1* | 7/2010 | Ohno | 396/55 |
| 2011/0013283 A1* | 1/2011 | Sato | 359/557 |
| 2011/0058799 A1* | 3/2011 | Chung et al. | 396/55 |

FOREIGN PATENT DOCUMENTS

| | | |
|---|---|---|
| JP | 09-061880 | 3/1997 |
| JP | 2001-042408 | 2/2001 |
| JP | 2009-163089 | 7/2009 |
| KR | 1020070070145 | 7/2007 |
| KR | 1020070089559 | 8/2007 |

* cited by examiner

*Primary Examiner* — Clayton E LaBalle
*Assistant Examiner* — Dennis Hancock
(74) *Attorney, Agent, or Firm* — The Farrell Law Firm, P.C.

(57) ABSTRACT

An image stabilizer is provided, which compensates for an external turbulence caused by hand-shake by moving an imaging unit. The image stabilizer includes a first yoke, a second yoke, and a driving frame interposed between the first yoke and the second yoke and movable in a vertical direction, a horizontal direction, and a rotation direction with respect to an optical axis. The imaging unit is mounted in a center of the driving frame. The image stabilizer also includes a coil plate connected to a surface of the driving frame facing the first yoke and having a plurality of pattern coils arranged at locations corresponding to a plurality of magnets of the second yoke. The image stabilizer further includes a support unit disposed on a surface of the driving frame facing the second yoke and supporting the driving frame in pitch, yaw and roll directions with respect to the second yoke.

12 Claims, 12 Drawing Sheets

IMAGE STABILIZER

PRIORITY

This application claims priority under 35 U.S.C. §119(a) to Korean Patent Application No. 10-2009-0101875, filed on Oct. 26, 2009, in the Korean Intellectual Property Office, the disclosure of which is incorporated herein by reference.

BACKGROUND OF THE INVENTION

1. Field of the Invention

The present invention relates generally to an image stabilizer, and more particularly, to an image stabilizer that is capable of correcting hand-shaking movement in yaw/pitch/roll directions.

2. Description of the Related Art

An image stabilizer is generally used in a camera or an electronic apparatus that is designed to capture and photograph an image. The image stabilizer moves an imaging unit, provided as a Charge-Coupled Device (CCD) or a Complementary Metal-Oxide Semiconductor (CMOS) sensor or optical lens located ahead of the imaging unit, in pitch/yaw directions, thereby correcting movement of the imaging unit caused by hand-shake or by external vibration and shock.

Relevant techniques that prevent a blurry image caused by hand-shake or external vibration include a shaft support method, a ball support method and a suspension wire/spring method. These methods move an imaging unit or a correction lens by driving an actuator, which consists of a coil and a magnet and which is disposed in a correction apparatus for compensating for displacement that occurs due to external factors such as hand-shake.

With the recent use of high pixel imaging units, the size of a pixel containing an image is reduced to 1.5 µm, and thus, there is an increased necessity to correct a blurry image caused by rotation of an optical axis.

However, in order to correct in pitch/yaw directions smoothly, an image stabilizer is intentionally configured to restrict movement in a rotation direction of an optical axis. Therefore, it is impossible provide corrections in a roll direction in which the imaging unit rotates with respect to the optical axis.

SUMMARY OF THE INVENTION

The present invention has been made to address at least the above problems and/or disadvantages and to provide at least the advantages described below. Accordingly, an aspect of the present invention provides an image stabilizer that has an improved configuration so as to correct a blurry image caused by hand-shake in pitch/yaw/roll directions.

According to one aspect of the present invention, an image stabilizer is provided that compensates for an external turbulence caused by hand-shake by moving an imaging unit. The image stabilizer includes a first yoke made of a magnetic material, a second yoke made of a magnetic material and including a plurality of magnets arranged so as to be rotation-symmetric with respect to a center of the second yoke. The image stabilizer also includes a driving frame interposed between the first yoke and the second yoke and movable in a vertical direction, a horizontal direction, and in a rotation direction with respect to an optical axis. The imaging unit is mounted in a center of the driving frame. The image stabilizer additionally includes a coil plate connected to a surface of the driving frame facing the first yoke and having a plurality of pattern coils arranged at locations corresponding to the plurality of magnets, so that the driving frame is moved by a magnetic interaction between the plurality of pattern coils and the plurality of magnets. The image stabilizer further includes a support unit disposed on a surface of the driving frame facing the second yoke and supporting the driving frame in pitch, yaw and roll directions with respect to the second yoke.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of the present invention.

Figure 1:
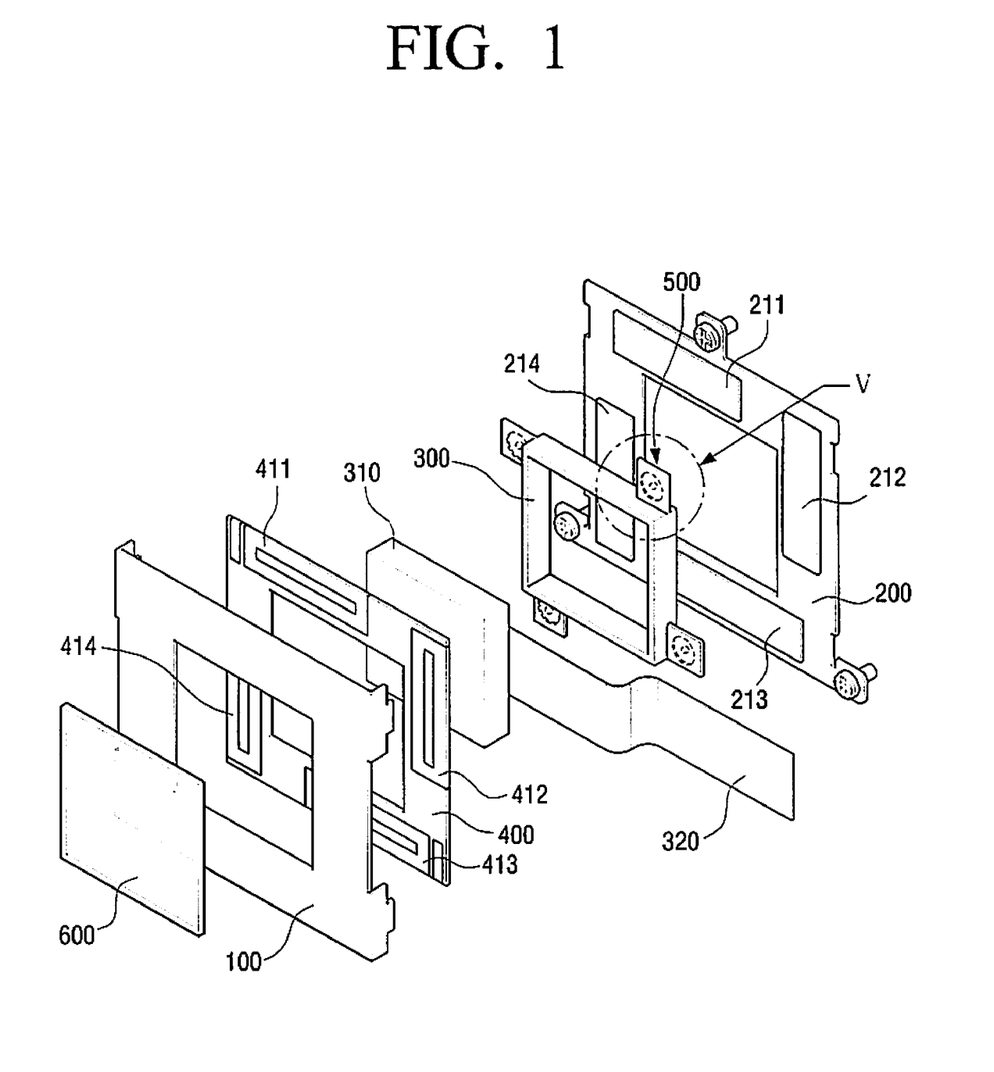
FIG. 1 is a diagram illustrating an exploded perspective view of an image stabilizer, according to a first embodiment of the present invention.
Figure 2:
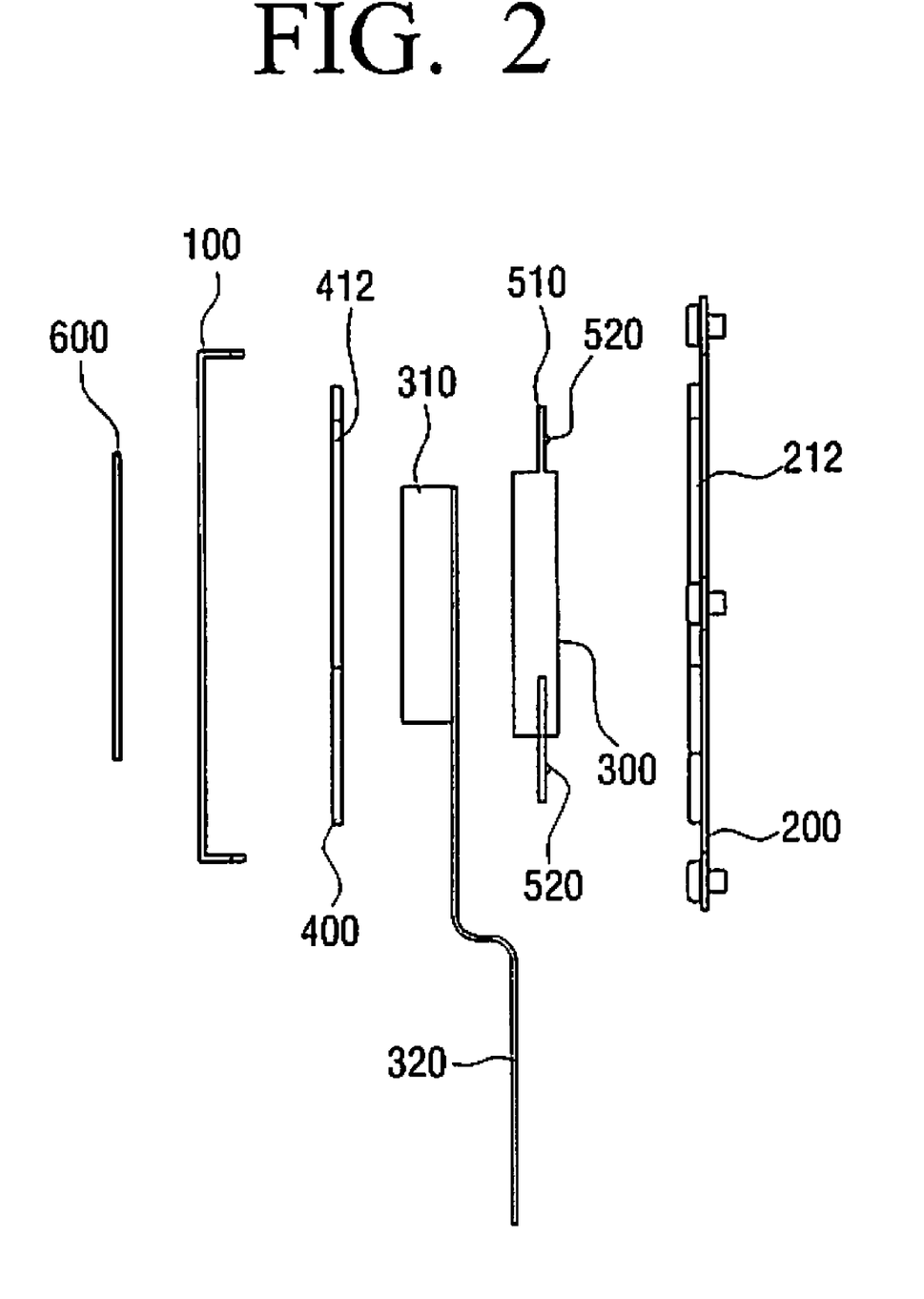
FIG. 2 is a diagram illustrating a side view of the image stabilizer of FIG. 1, according to an embodiment of the present invention.
Figure 3:
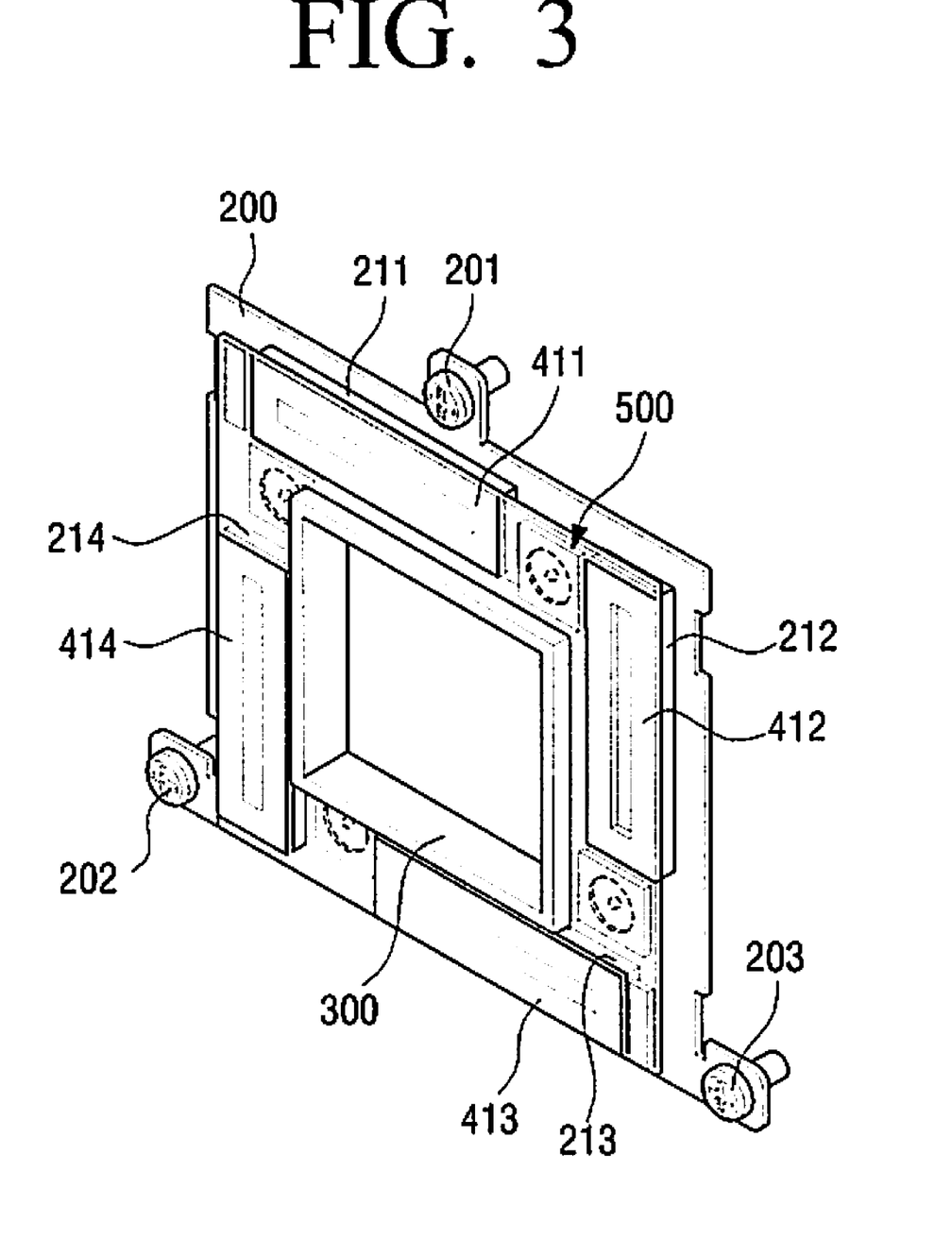
FIG. 3 is a diagram illustrating a perspective view of the image stabilizer in an assembled state, according to an embodiment of the present invention.
Figure 4:
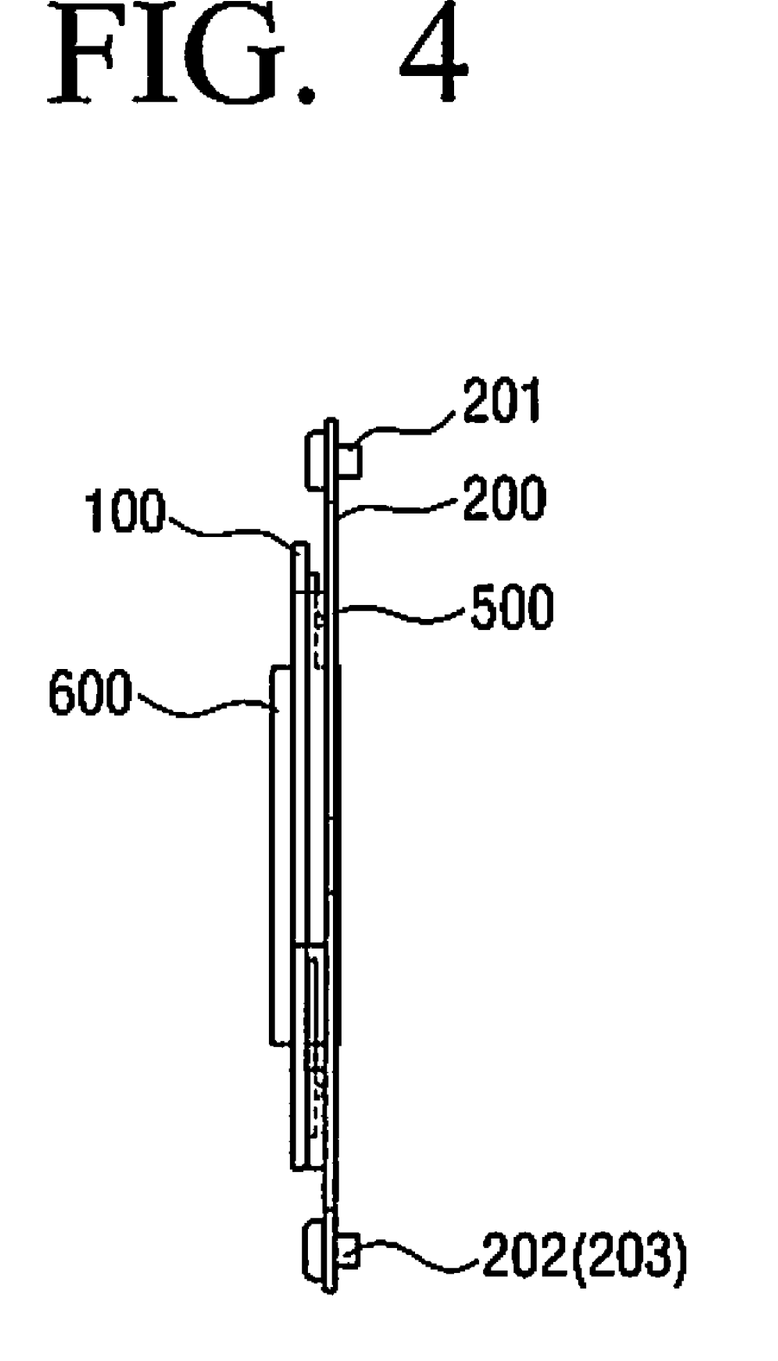
FIG. 4 is a diagram illustrating a side view of the image stabilizer of FIG. 3, according to an embodiment of the present invention.

FIG. 1 is a diagram illustrating a perspective view of an image stabilizer, according to a first embodiment of the present invention. FIG. 2 is a diagram illustrating a side view of FIG. 1. FIG. 3 is a diagram illustrating a perspective view of the image stabilizer in an assembled state. FIG. 4 is a diagram illustrating a side view of FIG. 3.

As shown in FIG. 1, the image stabilizer includes a first yoke 100, a second yoke 200, a driving frame 300, a coil plate 400, a support unit 500, and a glass cover 600.

The first yoke 100 is composed of magnetic material, such as steel, and forms an exterior of the image stabilizer.

The second yoke 200 is composed of magnetic material that is the same as the first yoke 100, and is fixed to a camera body. As shown in FIG. 3, the second yoke 200 may be fixed and supported at three points, specifically, at an upper fixing portion 201 and two lower fixing portions 202, 203, so that an assembly error in pitch/yaw directions can be minimized.

Four (first through fourth) magnets 211-214 are disposed on the second yoke 200. As shown in FIG. 1, the first through fourth magnets 211-214 are arranged so as to be rotation-symmetric with respect to a center of the second yoke 200. Specifically, the first and the second magnets 211, 212 are arranged perpendicular to each other, the second and the third magnets 212, 213 are arranged perpendicular to each other, the third and the fourth magnets 213, 214 are arranged perpendicular to each other, and the fourth and the first magnets 214, 211 are arranged perpendicular to each other. The magnets are formed in a rectangular shape and are the same size. Also, each magnet 211-214 is arranged such that its lengthwise surface faces a surface on which an imaging unit 310 is disposed.

The driving frame 300 is interposed between the first and the second yokes 100, 200 and is movable in a vertical direction, a horizontal direction, and in a rotation direction with respect to an optical axis. The imaging unit 310 is mounted in and fixed to a center of the driving frame 300. The imaging unit 310 may be a CCD or a CMOS chip set, and is connected to a controller (not shown) through a Flexible Printed Circuit (FPC) 320.

The coil plate 400 is connected to a surface of the driving frame 300 facing the first yoke 100, and includes an inner circumference enclosing a circumference of the driving frame 300. The coil plate 400 includes first through fourth pattern coils 411-414 arranged on locations corresponding to the first through fourth magnets 211-214, for forming magnetism. Since the driving frame 300 is press-fitted into the coil plate 400, the driving frame 300 is moved in association with the coil plate 400 when the coil plate 400 is moved due to the interaction between the first through fourth pattern coils 411-414 and the first through fourth magnets 211-214.

Figure 7:
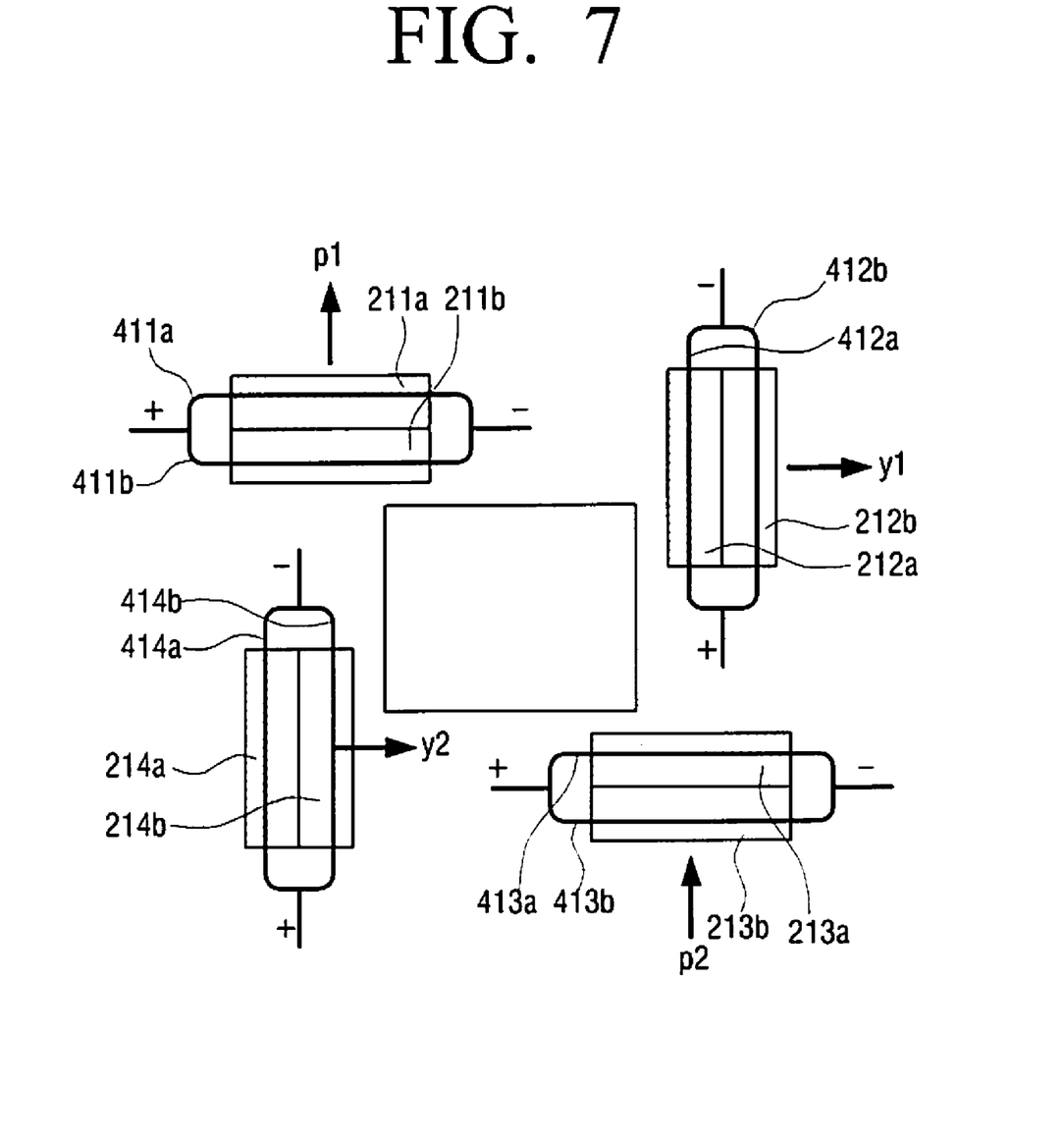
Figure 8:
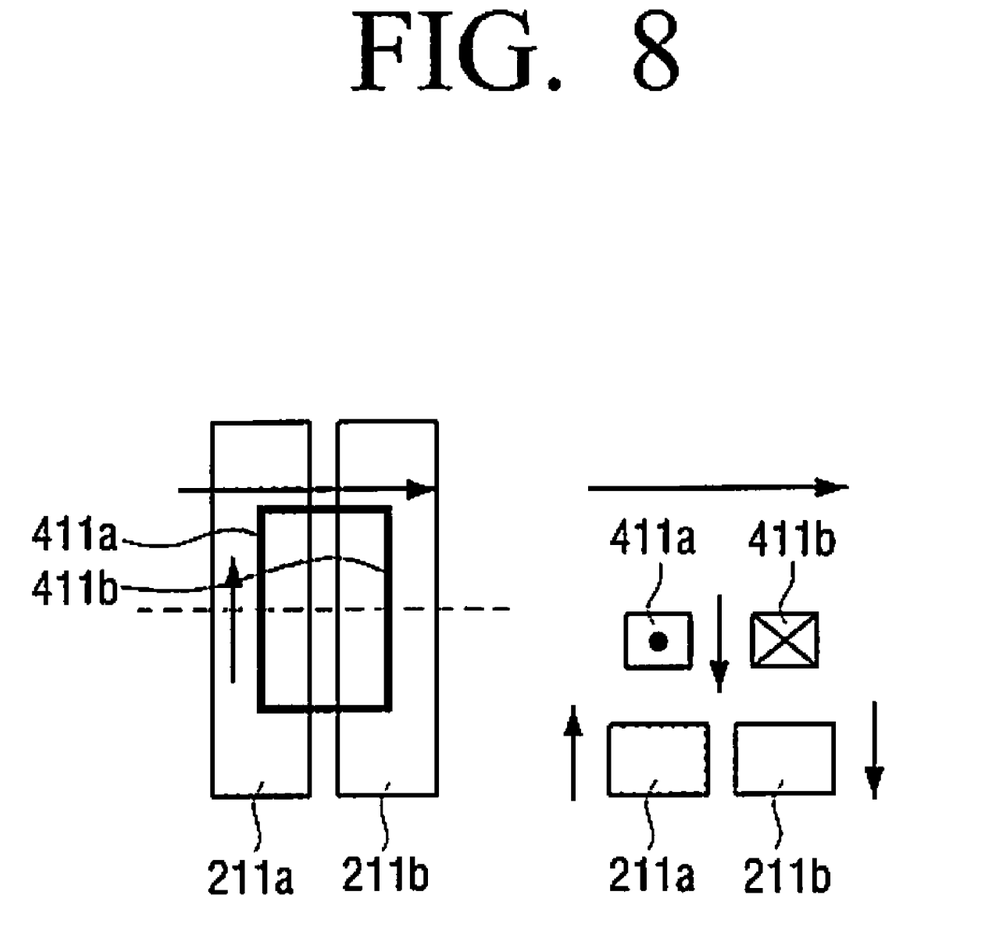

As shown in FIG. 7, the first pattern coil 411 has a closed loop including a first coil 411a which is formed at a location facing an N pole and a second coil 411b which is formed at a location facing an S pole, and thus has opposite ends connected to a positive (+) pole and a negative (−) pole, respectively. The second through fourth pattern coils 412-414 have the same configuration as the first pattern coil 411, involving respective first and second coils 412a, 412b, 413a, 413b, 414a and 414b.

The configuration and interaction of the first through fourth pattern coils 411-414 and the first through fourth magnets 211-214 is described in greater detail below.

The support unit 500 is disposed on a surface of the driving frame 300 facing the second yoke 200 and supports the driving frame 300 in three-axis directions, specifically, pitch/yaw/roll directions with respect the second yoke 200.

Figure 5:
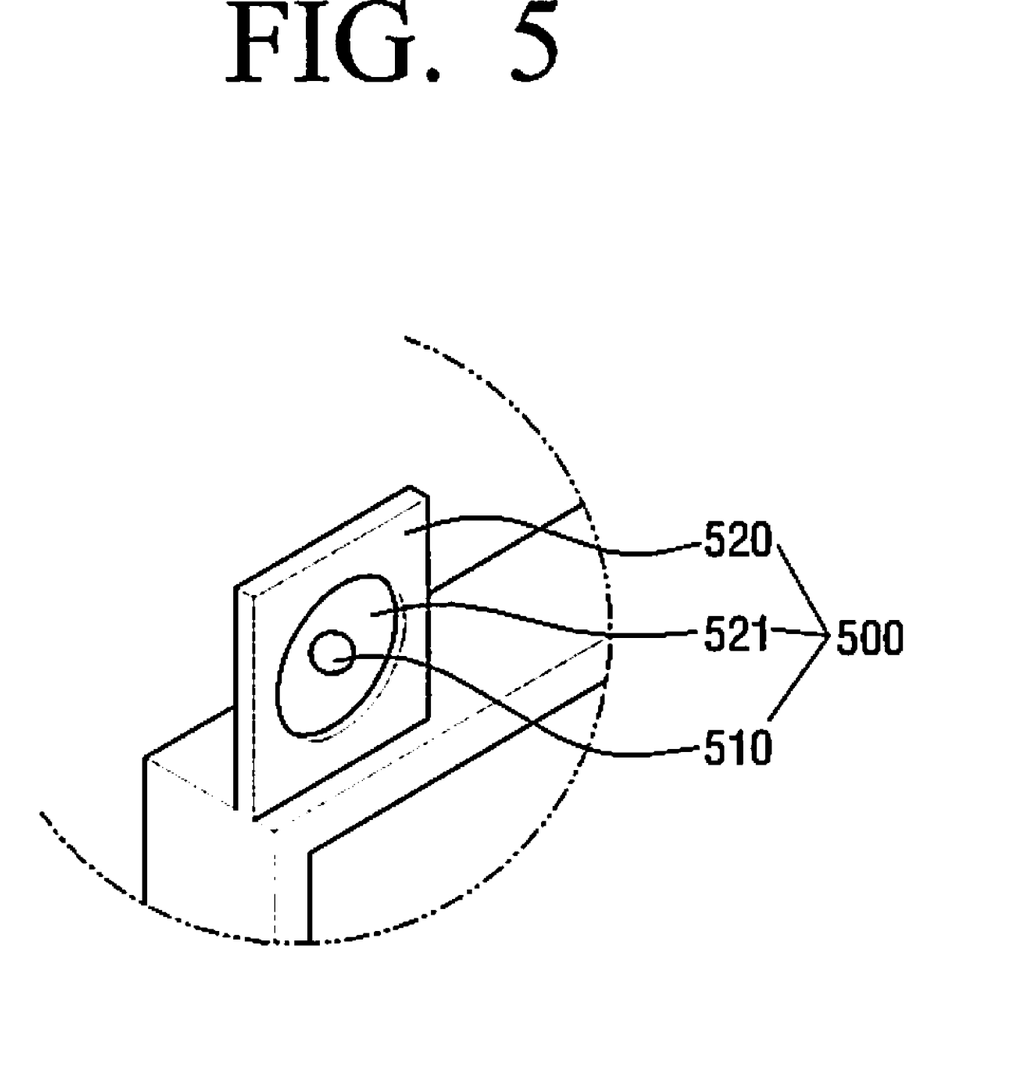
FIG. 5 is a diagram illustrating an enlarged perspective view of the support unit of FIG. 1, according to an embodiment of the present invention.

According to a first embodiment of the present invention, the support unit 500 includes a ball 510 and a support plate 520 as shown in FIG. 5.

The ball 510 is in roll-contact with the second yoke 200 and supports the driving frame 300 so that the driving frame 300 is moved in the pitch/yaw/roll 3-axis directions with respect to the second yoke 200.

The support plate 520 extends from the driving frame 300 and has a recess 521 to receive the ball 510 and thus the ball 510 is rolling on the second yoke 200 when the driving frame 300 is moved.

The support plate 520 may be disposed such that the support plate 520 does not interfere with the first through fourth magnets 211-214 and the first through fourth pattern coils 411-414, as shown in FIGS. 1-4.

Figure 12:
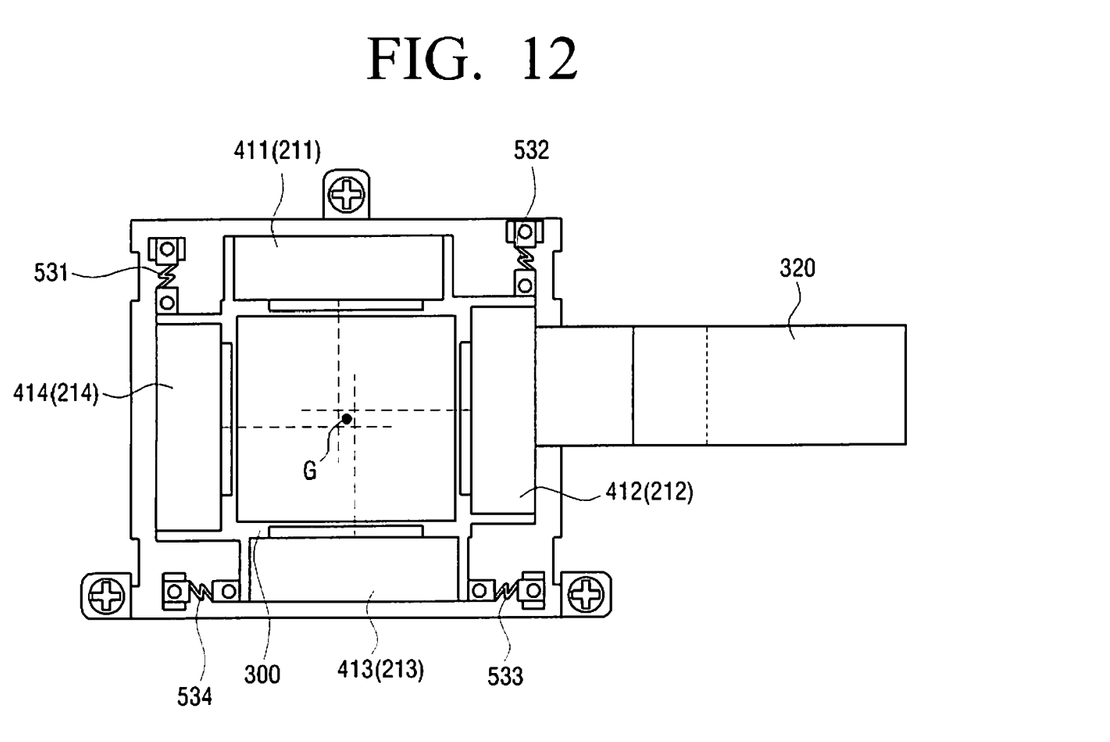
FIGS. 12 and 13 are diagrams illustrating an image stabilizer having a support unit, according to a second embodiment of the present invention.
Figure 13:
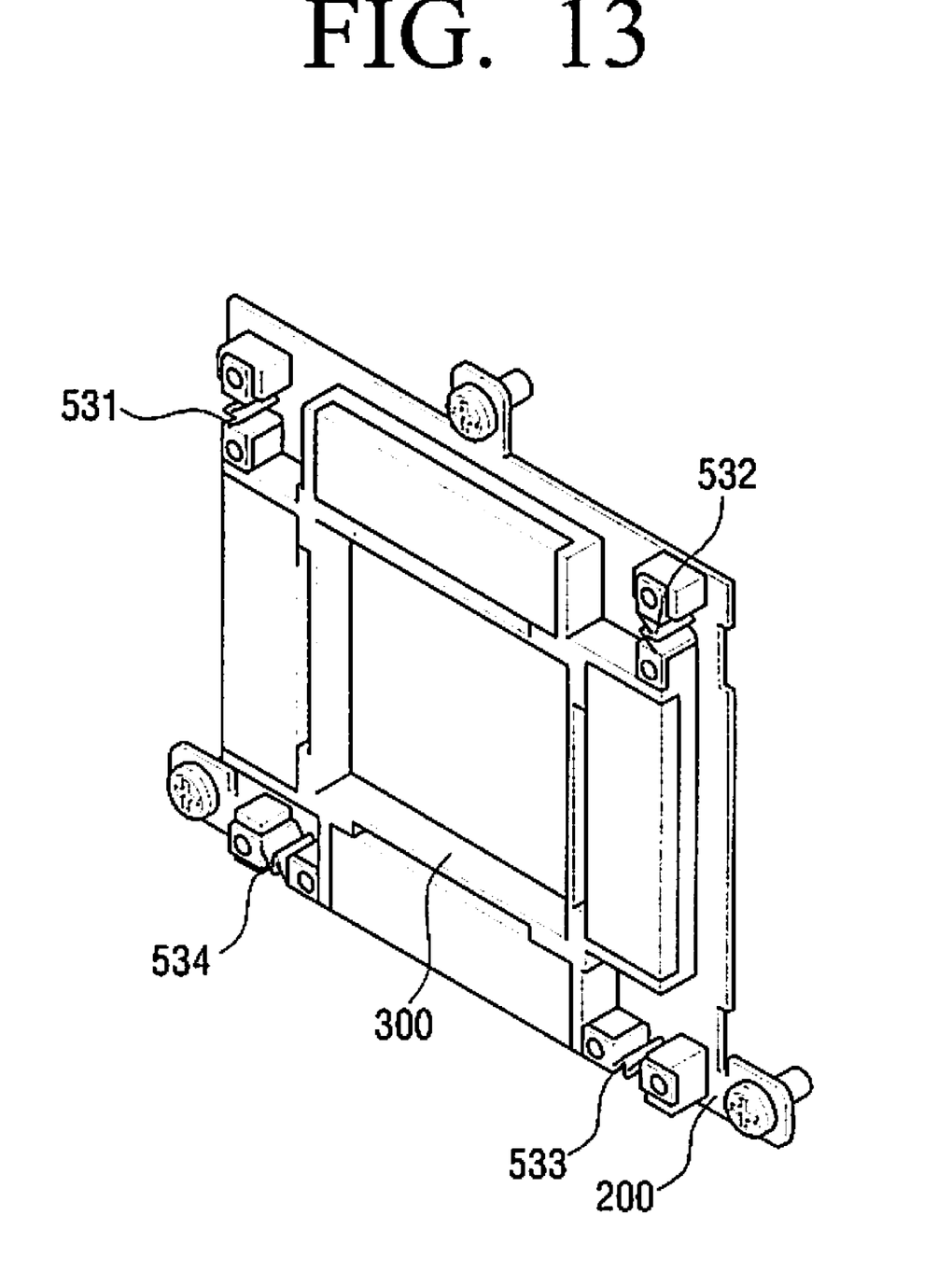

According to a second embodiment of the present invention, the support unit 500 includes first through fourth elastic members 531-534, each having one end connected to the driving frame 300 and another other end connected to the second yoke 200. The first through fourth elastic members 531-534 are disposed such that they do not interfere with the first through fourth magnets 211-214 and the first through fourth pattern coils 411-414, as shown in FIGS. 12 and 13.

The first through the fourth elastic members 531-534 may be plate springs having a pleat shape. As shown in FIGS. 12 and 13, the first and the third elastic members 531, 533 are arranged such that their lengthwise directions are parallel to the pitch direction, and the second and the fourth elastic members 532, 534 are arranged such that their lengthwise directions are parallel to the yaw direction. According to a system configuration, the directions in which the first through fourth elastic members 531-534 are arranged are variable.

Due to the above configuration of the support unit 500, each elastic member 531-534 elastically supports the driving frame 300 in yaw/pitch/roll directions, while maintaining a predetermined gap between the driving frame 300 and the second yoke 200, even if the driving frame 300 is moved in the yaw/pitch/roll 3-axis directions.

Hereinafter, an actuator of the image stabilizer according to the first embodiment of the present invention is described in detail.

The image stabilizer according to an embodiment of the present invention moves the imaging unit 310 in order to stabilize an image. The image stabilizer is an actuator of a Voice Coil Motor (VCM) method using an electromagnetic field, and includes the first through fourth pattern coils 411-414 and the first through forth magnets to correct movement of the imaging unit 310 in the pitch/yaw directions. Therefore, in order to correct movement of the imaging unit 310 in the roll direction, electromagnetic force may be sequentially generated at the first through fourth pattern coils 411-414 or different poles may be formed between neighboring pattern coils. A differential driving force is generated at each of the pattern coils 411-414 and a rotational force is generated by a moment force caused by the differential driving force.

The magnet has an N pole and an S pole in the same plane in order to generate a great force smoothly. The pattern coil is formed to have a rectangular structure. Also, the pattern coil is arranged on the magnet with an air gap being formed on the upper surface of the magnet. The pattern coil determines a direction of an electromagnetic force according to a direction of current flowing in the pattern coil.

Figure 6:
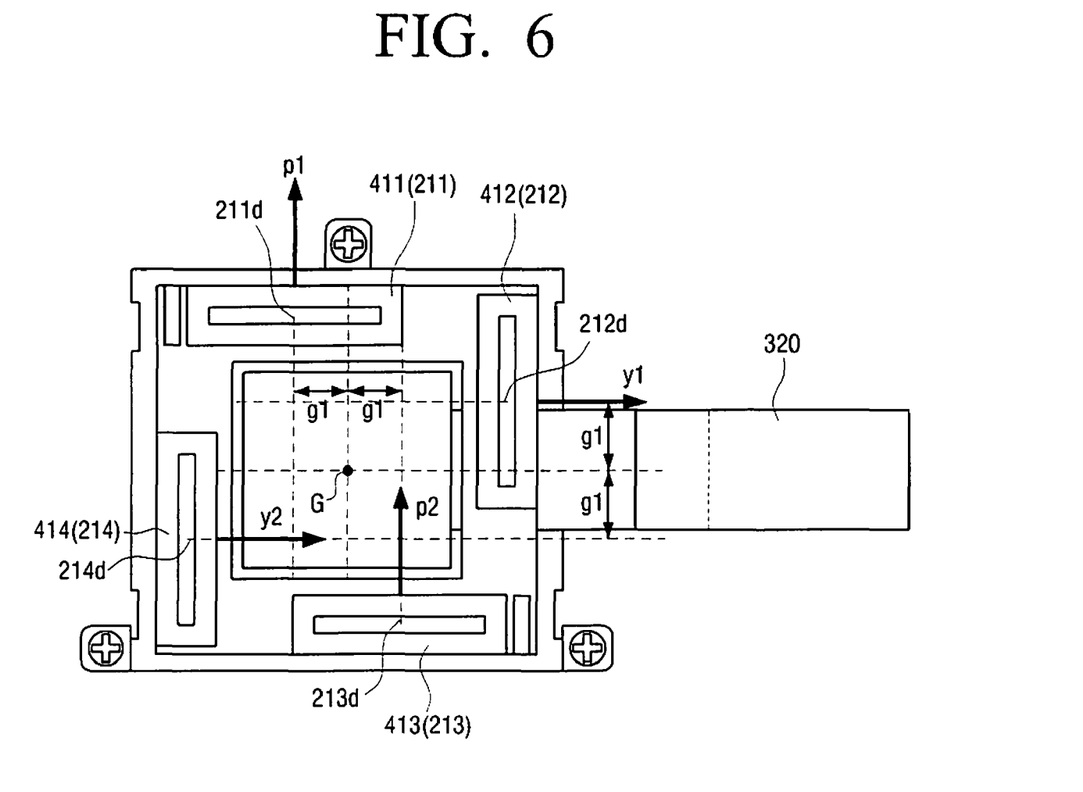
FIGS. 6-8 are diagrams illustrating an operation of the image stabilizer, according to an embodiment of the present invention.

FIG. 6 is a diagram illustrating the first through fourth magnets 211-214 and the first through fourth pattern coils 411-414 of the image stabilizer, according to an embodiment of the present invention.

In order to drive the imaging unit 310 (see FIG. 1), the driving frame 300 (sec FIG. 1) is required as an element for holding the imaging unit 310. The coil plate 400 on which the first through fourth pattern coils 411-414, interacting with the first through fourth magnets 211-214, are formed, is connected with the driving frame 300 in order to move the driving frame 300. According to another embodiment of the present invention, the first through fourth magnets 211-214 may be formed on the driving frame 300, whereas the first through fourth pattern coils 411-414 may be formed on the second yoke 200. However, since the weight of the first through fourth pattern coils 411-414 is lighter than the weight of the first through fourth magnets 211-214 in general, it is more preferable that the first through fourth magnets 211-214 are formed on the second yoke 200, which is a fixed structure, and the first through fourth pattern coils 411-414 are formed on the driving frame 300, which is a movable structure.

If correction is needed due to an external disturbance such as hand-shake, electric current is applied to the first through fourth pattern coils 411-414 to generate an electromagnetic force and shift the imaging unit 310. The imaging unit 310 should be moved in a plane direction (pitch/yaw directions) which is perpendicular to an optical axis. To achieve this, the support plate 520 extending from the driving frame 300 is provided as a support structure and the ball 510 seated in the recess 521 of the support plate 520 supports the movement of the driving frame 300 in not only the pitch/yaw directions, but also the roll direction with respect to the second yoke 200.

A metal pin may be inserted or mounted in the support plate 520 if the first through fourth magnets 21'-214 are formed on the driving frame 300. However, since the weight of the driving frame 300 is increased, response performance may deteriorate.

The first magnet 211 is arranged in an off-set manner such that a center 211d of the first magnet 211 is located a predetermined distance 'g1' away from a center G of the second yoke 200, which corresponds to an optical axis. Also, as shown in FIG. 6, centers 212d-214d of the second through fourth magnets 212-214 are located the same distance 'g1' away from the center G of the second yoke 200. As a consequence, the first through fourth magnets 211-214 are eccentrically symmetrical with respect the center G of the second yoke 200.

An N pole 211a of the first magnet 211 is located on an upper side and an S pole 211b is located on a lower side, as shown in FIG. 7. The first coil 411a of the first pattern coil 411 is located at the N pole 211a of the first magnet 211, and the second coil 411b of the first pattern coil 411 is located at the S pole 211b of the first magnet 211. A positive (+) pole and a negative (−) pole are connected to opposite ends of the first pattern coil 411. The negative (−) pole is grounded. The third magnet 213 is arranged such that an N pole 213a and an S pole 213b are arranged in the same direction as those of the first magnet 211.

As shown in FIG. 7, an N pole 212a of the second magnet 212 is located on a left side and an S pole 212b is located on a right side in FIG. 7. The first coil 412a of the second pattern coil 412 is located at the N pole 212a of the second magnet 212 and the second coil 412b of the second pattern coil 412 is located at the S pole 212b of the second magnet 212. A positive (+) pole and a negative (−) pole are connected to opposite ends of the second pattern coil 412. The negative (−) pole is grounded. The fourth magnet 214 is arranged such that an N pole 214a and an S pole 214b are arranged in the same direction as those of the second magnet 212.

Forces generated by the electromagnetic force generated between the first through fourth magnets 211-214 and the first through fourth pattern coils 411-414, arranged on locations corresponding to the first through fourth magnets 211-214, are expressed by a first pitch force P1, a second pitch force P2, a first yaw force y1 and a second yaw force y2, as indicated by arrows in FIGS. 6 and 7.

If no external disturbance occurs in the rotation direction with respect to the center G of the second yoke 200, which corresponds to an optical axis, the first and the second pitch forces p1, p2 and the first and the second yaw forces y1, y2 are controlled to have the same value so that hand-shake correction for the pitch/yaw directions can be achieved as in a general image stabilizer.

If an external disturbance occurs in the rotation direction with respect to the center G of the second yoke 200, it is determined whether the external disturbance is in a clockwise direction or a counter clockwise direction and then hand-shake correction is performed with respect to the rotation direction.

For example, if an external disturbance occurs due to rotation in a counter clockwise direction, correction should be made by rotation in the opposite direction, i.e., in a clockwise direction. If the first pitch force p1 is set to be greater than the second pitch force p2 and the first yaw force y1 is set to be greater than the second yaw force y2, the driving frame 300 is rotated in the clockwise direction due to the difference between the forces. To the contrary, if an external disturbance occurs due to rotation in a clockwise direction, correction should be made by rotation in the opposite direction, i.e., in a counter clockwise direction. If the first pitch force p1 is set to be less than the second pitch p2 and the first yaw force y1 is set to be less than the second yaw force y2, the driving frame 300 is rotated in the counter clockwise direction due to the difference between the forces.

In the case of an existing two-axis driving method, the number of power lines to apply current to the coils is four, specifically, two power lines for the positive (+) pole and the negative (−) pole of the pitch direction, and two power lines for the positive (+) pole and the negative (−) pole of the yaw direction. However, in the case of a three-axis driving method including a roll direction axis, the pattern coils 411-414 should be driven individually in the different directions in order to move the imaging unit 310 in the roll direction. Accordingly, additional four power lines are required and thus 8 power lines are required in total. However, an increase in the number of power lines to apply current to the coils causes an increase in thickness of the FPC 320 and an increase in weight of the FPC 320 deteriorates the correcting operation of the imaging unit 310. Also, the increase in the weight of the FPC 320 may be regarded as an important factor to deteriorate a servo characteristic.

Figure 9:
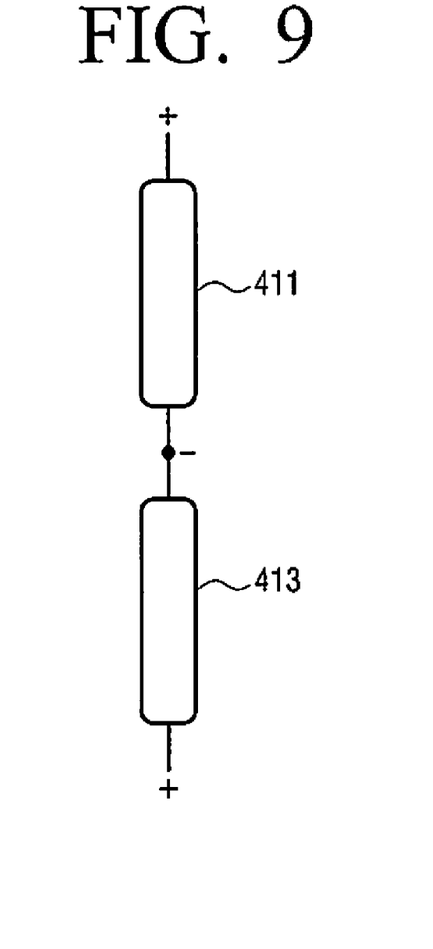
FIGS. 9 and 10 are diagrams illustrating a common grounded terminal shared by pattern coils, according to an embodiment of the present invention.
Figure 10:
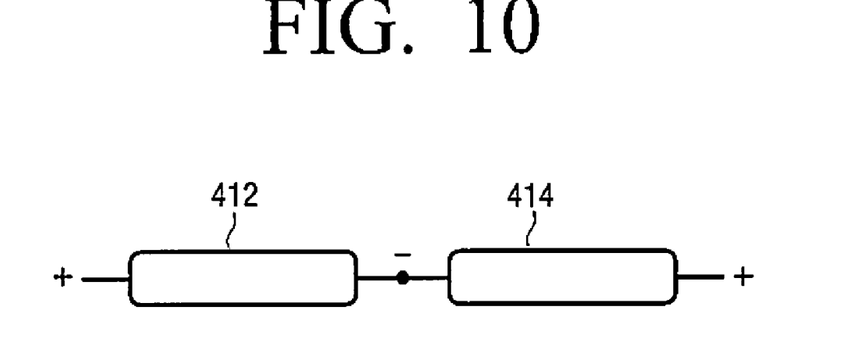

In order to solve the above problems, as shown in FIGS. 9 and 10, the negative (−) poles of the first through the fourth patterns coils 411-414 are grounded by being connected to a single terminal, and the single terminal is connected to the FPC 320 to exchange signals. In this case, since a single grounded line is required in the FPC 320 and is commonly used by the negative pole terminals of the first through fourth pattern coils 411-414, the number of lines of the FPC 320 is reduced from 8 to 5. Therefore, as the width of the FPC 320 is reduced, the weight of the FPC 320 is reduced. Accordingly, the response performance can be improved due to the reduction in the weight of the FPC 320 connected with the imaging unit 310.

Figure 11:
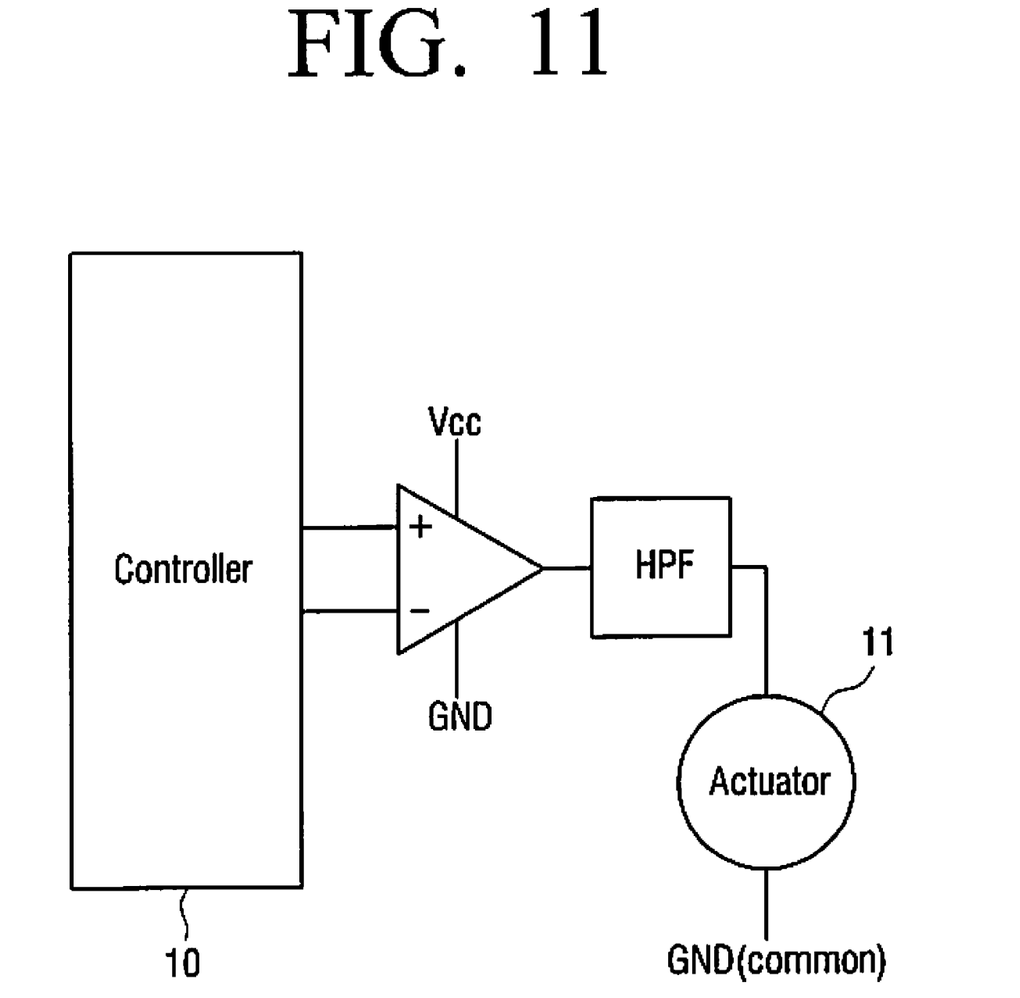
FIG. 11 is a block diagram illustrating an actuator, according to an embodiment of the present invention.

FIG. 11 is a block diagram illustrating the image stabilizer, according to an embodiment of the present invention.

As shown in FIG. 11, in the actuator 11 including the first through the fourth magnets 211-214 and the first through the fourth pattern coils 411-414, the negative (−) pole is connected to the common grounded terminal and thus the number of terminals for controlling voltage is less than in an existing controller 10.

FIGS. 12 and 13 are diagrams illustrating an image stabilizer, according to a second embodiment of the present invention. The image stabilizer operates in the same way as in the first embodiment. The difference from the first embodiment is that the support unit 500 is configured using an elastic member.

According to the above-described configuration, it is possible to correct for the three axes by driving the pattern coils for the pitch/yaw directions differentially without requiring an additional coil pattern for a roll direction.

While the invention has been shown and described with reference to certain embodiments thereof, it will be understood by those skilled in the art that various changes in form and detail may be made therein without departing from the spirit and scope of the invention, as defined by the appended claims.

What is claimed is:

1. An image stabilizer, which compensates for an external turbulence caused by hand-shake by moving an imaging unit, the image stabilizer comprising:
    a first yoke made of a magnetic material;
    a second yoke made of a magnetic material and comprising a plurality of magnets arranged so as to be rotation-symmetric with respect to a center of the second yoke;
    a driving frame interposed between the first yoke and the second yoke and movable in a vertical direction, a horizontal direction, and a rotation direction with respect to an optical axis, wherein the imaging unit is mounted in a center of the driving frame;
    a coil plate connected to a surface of the driving frame facing the first yoke and comprising a plurality of pattern coils arranged at locations corresponding to the plurality of magnets, so that the driving frame is moved by a magnetic interaction between the plurality of pattern coils and the plurality of magnets; and
    a support unit disposed on a surface of the driving frame facing the second yoke, which supports the driving frame in pitch, yaw and roll directions with respect to the second yoke.

2. The image stabilizer as claimed in claim 1, wherein each of the plurality of magnets have an N-pole and an S-pole formed on a surface facing the pattern coil, a first magnet of the plurality of magnets is located on an upper portion with respect to the imaging unit, a second magnet of the plurality of magnets is located on a lower portion with respect to the imaging unit, a third magnet of the plurality of magnets is located on a left portion with respect to the imaging unit, and a fourth magnet of the plurality of magnets is located on a right portion with respect to the imaging unit.

3. The image stabilizer as claimed in claim 2, wherein the first and second magnets are arranged perpendicular to each other, the second and third magnets are arranged perpendicular to each other, the third and fourth magnets are arranged perpendicular to each other, the fourth and first magnets are arranged perpendicular to each other, and the center of the imaging unit is a same predetermined distance away from a center of each of the first through fourth magnets.

4. The image stabilizer as claimed in claim 3, wherein the first through fourth magnets have a rectangular shape of a same size, and have a lengthwise surface facing the imaging unit.

5. The image stabilizer as claimed in claim 4, wherein the plurality of pattern coils comprise first through fourth pattern coils arranged to correspond to the first through fourth magnets, respectively, cacti of the first through fourth pattern coils comprises a first coil of a closed loop disposed at a location facing a respective N-pole and a second coil of a closed loop disposed at a location facing a respective S-pole, and opposite ends of each pattern coil are connected to a positive (+) pole and a negative (−) pole.

6. The image stabilizer as claimed in claim 5, wherein the negative poles of the plurality of pattern coils are connected to a single terminal to be grounded.

7. The image stabilizer as claimed in claim 1, wherein the support unit comprises:
    a ball in roll-contact with the second yoke; and
    a support plate extending from the driving frame and having a recess to receive the ball.

8. The image stabilizer as claimed in claim 7, wherein the support unit is disposed at a location such that the support unit does not interfere with the plurality of magnets.

9. The image stabilizer as claimed in claim 1, wherein the support unit is disposed at a location such that the support unit does not interfere with the plurality of magnets, and the support unit is an elastic member having one end connected to the driving frame and the other end connected to the second yoke.

10. The image stabilizer as claimed in claim 9, wherein the elastic member is a plate spring having a pleat shape.

11. The image stabilizer as claimed in claim 1, wherein the second yoke is fixed at three points.

12. The image stabilizer as claimed in claim 1, wherein the driving frame is connected to a Flexible Printed Circuit (FPC), which transmits signals to the coil plate and the imaging unit.

* * * * *